J. A. SWEET.
PROCESS OF DRAWING GLASS.
APPLICATION FILED OCT. 23, 1911.
1,295,158.
Patented Feb. 25, 1919.
2 SHEETS—SHEET 2.
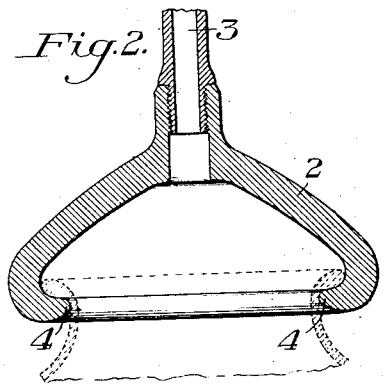
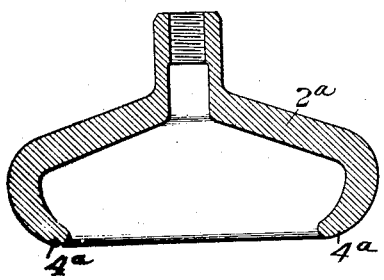
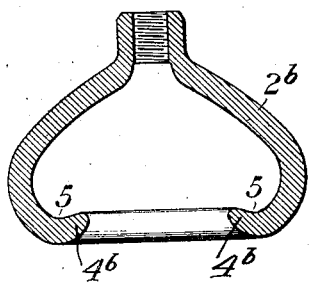
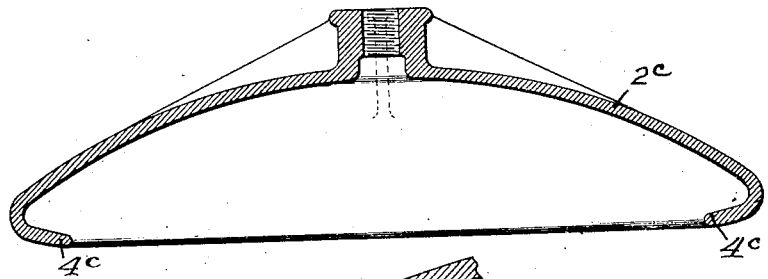
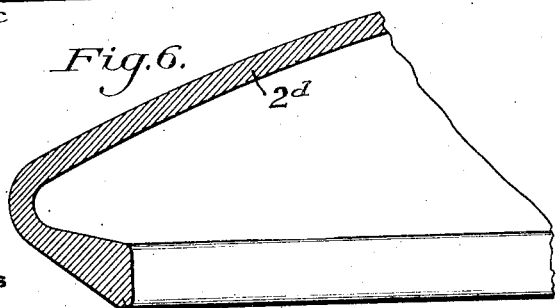
WITNESSES
R. H. Balderson
W. Famariss
INVENTOR
Jno. A. Sweet.
by Bakewell, Byrnes & Parmelee
Attys

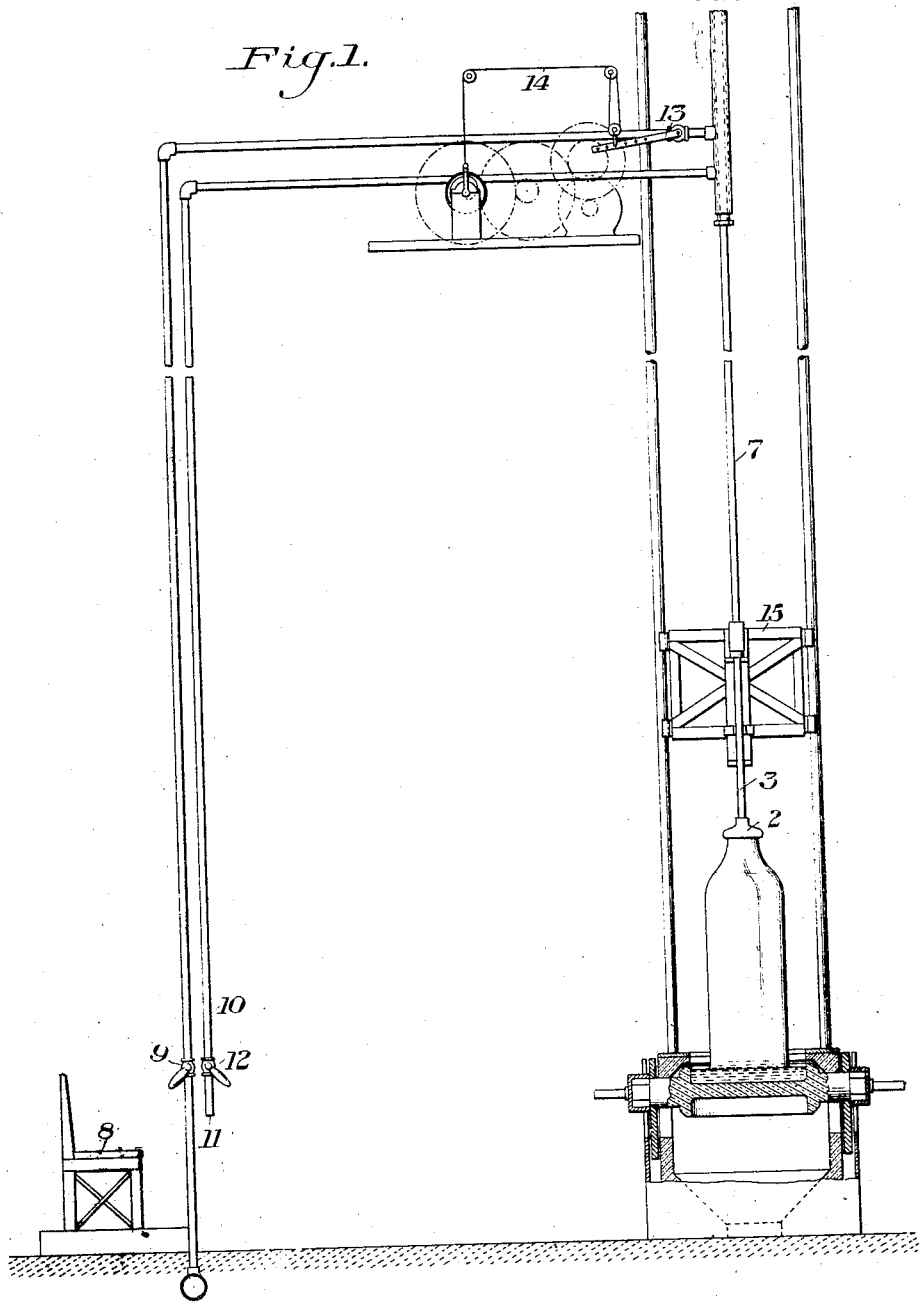

UNITED STATES PATENT OFFICE.

JOHN A. SWEET, OF NEW KENSINGTON, PENNSYLVANIA, ASSIGNOR TO WINDOW GLASS MACHINE COMPANY, OF PITTSBURGH, PENNSYLVANIA, A CORPORATION OF NEW JERSEY.

PROCESS OF DRAWING GLASS.

1,295,158. Specification of Letters Patent. Patented Feb. 25, 1919.

Application filed October 23, 1911. Serial No. 656,250.

*To all whom it may concern:*

Be it known that I, JOHN A. SWEET, a resident of New Kensington, Westmoreland county, Pennsylvania, have invented a new and useful Improvement in Processes of Drawing Glass, of which the following is a full, clear, and exact description, reference being had to the accompanying drawings, forming part of this specification, in which—

Figure 1 is a side elevation, partly diagrammatic, showing one form of apparatus for carrying out my invention; and Figs. 2, 3, 4, 5 and 6 are enlarged sectional views of various forms of bait which I may use in connection with my method.

My invention relates to the drawing of glass articles upwardly from a bath of molten glass, and is designed to cheapen and facilitate the operation and reduce breakage.

Heretofore in the actual drawing of glass articles, such as glass rollers or cylinders from a bath of molten glass, the bait employed for dipping into the glass has been a heated blow pipe consisting of a metal stem with a ball-shaped lower end, which ball portion has been heated so that the glass will adhere to it when lowered into the bath. After the cylinder or article has been drawn, the bait and cylinder have been removed, the cylinder cracked off from the bait, the bait must then be cleaned from the glass adhering to it. The cleaning of these ball-shaped portions of the bait is a laborious and slow operation, and requires the heating of the adherent glass until it is viscid, and then digging it out of the hole in the bait and cleaning the outer parts of the bait. The bait must also be heated to the proper temperature for drawing, and a supply of the heated baits kept on hand for this purpose. The contracting of the metal bait at a different rate from that of the glass is also liable to crack the glass away from the bait and cause a loss of the article being drawn. To assist in overcoming this, hoods have been used to retard the cooling of the bait as it rises during the drawing of the article.

My invention overcomes the cleaning of the baits from the adherent glass, reduces the liability to breakage, and also greatly lengthens the life of the bait, which, owing to repeated heatings and coolings, wears away rapidly in the old system.

In carrying out my invention, I employ a relatively cold bait; that is, a bait which is sufficiently cooler than the glass to cool the retaining or anchoring lip or rib of glass on the ledge of the bait; and also cool enough to prevent the glass from heating the bait with sufficient rapidity to cause sticking of the glass thereto if held in the bath sufficiently long to form the anchoring rib or lip.

In carrying out my invention, I preferably employ a cold metal bait having a ledge or ledges preferably in the form of an inwardly projecting lip or ledge which forms an undercut cavity in the bait. This bait is lowered into the bath of molten glass, and if a hollow article is being drawn the air pressure leading to the bait is reduced to a point where the glass will enter the bait and chill upon the inner surrounding ledge while an air circulation is preferably maintained through the bait to assist in the chilling of the glass anchor. It will be understood that the air pressure, if such pressure is maintained in the bait, must be low enough to allow the glass to enter said hollow bait; while at the same time I prefer to supply air to the bait so that this air may assist in chilling the anchorage glass on the ledge of the bait and release the excess air through a vent hole. The bait is held in this position a sufficient length of time to chill the glass resting on the inner ledge enough so that it will support the upper portion of the glass article to be drawn. The bait is then gradually lifted out of the bath before it has become heated to a temperature at which the glass will adhere to it either inside or outside. This preventing of sticking is of the greatest importance, since I have discovered that if the glass sticks to the bait the contraction of the glass and bait will destroy the adhesion and the glass will be pulled away from the bait and thereby shatter the article being drawn. By keeping the cold bait in the bath just long enough to chill the glass rib sufficiently to sustain the upper portion of the article and withdrawing the bait from the bath before it has become hot enough for the glass to adhere to it, I am enabled to prevent sticking of the glass to the bait and at the same time obtain an anchorage which will support the article as it is drawn up. The length of time during which the bait is held in the bath will vary somewhat, depending on the temperature of the glass bath, he amount of metal in the bait and its temperature. In certain specific instances I have found that from 15 to 30 seconds is the correct time to chill the glass rib sufficiently and yet avoid sticking of the glass to the bait. This however, will vary considerably under different conditions, and I do not wish to limit myself to any specific period.

When the cold bait is lowered into the glass bath, the lower portion of the bait will chill that portion of the glass bath which it enters, this being visible as a chilled circular portion of glass around the bait and in the bath. The bait should be of such shape that this chilled glass cannot catch or hang thereon. For this purpose it is preferably of decreasing external diameter below the glass level and has a smooth, rounded, external surface. During the forming of the upper part or cap of the article, the operator manipulates the bait so that this outer ring-shaped portion of chilled glass in the bath will be lifted and taken up on the cap or cull portion of the cylinder or roller, in the case of drawing window glass rollers. This chilled glass portion would injure the roller or article being drawn, and is, therefore, taken up on the cap, or cull, portion. After this taking up of this chilled portion, the cap portion is fully expanded to the size of cylinder desired, and the drawing is carried on in the usual way.

After the inner chilled ring has been formed, the operator must be careful not to expand the portion of the article below such ring and adjacent to the under side of the bait sufficiently soon to cause the glass to swell outwardly to such an extent as to form a fold or lip of such character that in chilling it would exert a clamping action on the bait. The article itself must hang freely from the chilled ring or rib of glass resting on the ledge of the bait.

In drawing up the article after the anchoring glass has been chilled, the air is supplied to the interior of the article in the usual manner, the article being distended or held to shape by this air pressure during the draw.

When the bait and attached article are lowered onto the horse, it will be found in the use of my invention that the glass is loose in the bait. In the case of a circular bait, the bait can be turned around on the chilled ring of glass within it, showing that there is no adhesion between the two and no sticking or hanging of the glass either to the outside of the bait or even to its lower portion, there being no glass on the outer side of the bait.

In the actual practice of my invention, I have employed baits consisting of hollow copper castings of forms such as shown in Figs. 2, 3, 4, 5 and 6. In Fig. 2 the bait 2 is of general conical form attached to the pipe portion 3 and having the inwardly projecting annular ledge 4, which preferably projects substantially horizontally, at least as to its upper inner ledge portion.

In Fig. 3 I show a modified form in which the ledge $3^a$ of the bait $2^a$ is somewhat changed in form. In Fig. 4 I show a form where the receiving recess 5 formed by the ledges $3^b$ is of slightly cupped form.

In Fig. 5 I show a form of bait designed for use in drawing an article of substantially the size of the opening of a bait $2^c$ having the ledge $3^c$, there being little or no neck formed during the draw.

In Fig. 6 I show a form like that of Fig. 5, except that the inwardly projecting ledge portion $3^d$ of the bait $2^d$ is thickened and made heavier.

In Fig. 1, 2 represents the bait, 3 the detachable blow pipe, 7 the usual telescope pipe system, 8 the operator's pulpit, and 9 the usual control valve for the air. 10 indicates a branch pipe extending back from the telescope pipe system to a vent hole 11, having a control valve 12 for regulating the size of the hole. 13 is the usual automatic control valve for the air, which is actuated by means of connections 14 leading to the hoisting system for the cage 15 to which the blow pipe is detachably secured.

The advantages of my invention result from the use of a cold bait in the peculiar manner above described, that is, by dipping it into the bath and chilling a rib of glass on the inside ledge of the bait, while lifting the bait before it reaches a temperature where the glass will stick to any part of it. It also results from the reducing of the air pressure in the case of hollow articles to allow the glass to satisfactorily enter and form the rib on the bait ledge, &c. Also from the use of a bait having the characteristics pointed out whereby an anchorage is formed without adhesion of the glass thereto.

My invention greatly reduces the labor and expense of drawing glass, in doing away with the cleaning of the baits, the heating of the baits, and the waste and rapid wear of these baits. It is preferable to keep a supply of the cold baits on hand so that one may be changed for another as they become heated. If one bait is continuously and rapidly used it will reach a temperature where the glass is more liable to stick to it when lowered into the bath.

In the use of a heated bait, it is necessary to make it of sufficient body to prevent rapid loss of heat. If therefore, it be made large enough to work properly with large cylinders, it becomes heavy and difficult to handle. It is also necessary to use great care in keeping the bait out of contact with the body of the operator. Furthermore, the hot glass causes erosion of the bait, which not only affects the color of the glass adhering thereto; but the subsequent removal of the adhering glass brings with it a scale of metal, so that the bait rapidly wears away. In using a heated bait, it is usually necessary to allow the glass to get a certain amount of surface chill before lowering the heated bait into it. With a cold bait, this is unnecessary, since the cold bait itself chills the glass to the proper extent. The bait can therefore be immediately lowered into the glass, and a considerable saving of time be effected in a day's run.

Other material or metal may be employed for the bait, the shape of the bait may be varied widely, the invention may be applied to drawing sheets, and other changes may be made without departing from my invention.

I claim:—

The method of drawing glass, consisting in lowering into a bath of molten glass a bait having an internal ledge, maintaining the bait at a temperature to chill the glass on the ledge, lifting the bait from the bath and picking up the chilled glass of the bath resulting from the lowering of the bait into the bath on the upper culled portion of the article, and then drawing the article below said chilled glass portion; substantially as described.

In testimony whereof I have hereunto set my hand.

JOHN A. SWEET.

Witnesses:
  ALICE A. TRILL,
  R T WHALEN.